US006606888B2

(12) United States Patent
Steinle et al.

(10) Patent No.: US 6,606,888 B2
(45) Date of Patent: Aug. 19, 2003

(54) LOCK STRUCTURE FOR AMMONIA NURSE TANK VALVE UNITS

(75) Inventors: Michael J. Steinle, Lawrence, KS (US); Guy Swenson, Barnesville, MN (US)

(73) Assignee: Farmland Industries, Inc., Kansas City, MO (US)

( * ) Notice: Subject to any disclaimer, the term of this patent is extended or adjusted under 35 U.S.C. 154(b) by 1 day.

(21) Appl. No.: 09/800,341

(22) Filed: Mar. 6, 2001

(65) Prior Publication Data

US 2002/0124605 A1 Sep. 12, 2002

(51) Int. Cl.[7] ............................................. F16K 35/00
(52) U.S. Cl. .............................. 70/178; 70/211; 70/212
(58) Field of Search ................... 70/175–180, DIG. 34, 70/211, 212; 137/382, 383, 384.2, 385

(56) References Cited

U.S. PATENT DOCUMENTS

| | | | |
|---|---|---|---|
| 1,484,793 A | | 2/1924 | Moore |
| 1,530,814 A | * | 3/1925 | Credle ........................ 70/178 |
| 1,817,802 A | | 8/1931 | Cooper |
| 2,166,730 A | | 7/1939 | Schanck |
| 3,391,554 A | | 7/1968 | Wrenshall ................... 70/178 |
| 3,578,348 A | | 5/1971 | Reinke ......................... 280/5 |
| 3,895,507 A | * | 7/1975 | Moy ............................ 70/177 |
| 3,963,144 A | * | 6/1976 | Berwald ..................... 137/382 |
| 4,208,893 A | | 6/1980 | Avrach ........................ 70/178 |
| 4,456,027 A | * | 6/1984 | Belgard ...................... 137/375 |
| 4,630,456 A | * | 12/1986 | Nielsen, Jr. .................. 285/80 |
| 4,681,134 A | * | 7/1987 | Paris, Sr. .................... 137/382 |
| 4,781,044 A | * | 11/1988 | Ortega ......................... 70/159 |
| 5,353,833 A | | 10/1994 | Martinez .................... 137/385 |
| 5,560,233 A | * | 10/1996 | Watkins ...................... 137/383 |
| 5,735,147 A | * | 4/1998 | Cattanach et al. .......... 137/382 |
| 5,927,111 A | * | 7/1999 | Nachbauer .................. 137/382 |
| 6,044,670 A | | 4/2000 | Citurs et al. .................. 70/169 |
| 6,170,306 B1 | * | 1/2001 | Kitley et al. ................ 137/382 |
| 6,354,116 B1 | * | 3/2002 | Drake ......................... 137/382 |

* cited by examiner

*Primary Examiner*—Anthony Knight
*Assistant Examiner*—John B. Walsh
(74) *Attorney, Agent, or Firm*—Hovey Williams, LLP

(57) ABSTRACT

An anti-pilfer lock device is provided for protecting against unauthorized access to the flow control valve units projecting from the outer surface of a mobile ammonia nurse tank. A box-shaped housing is sized and configured to be removably mounted on the shell of the nurse tank in complemental conforming relationship thereto in a position shielding the flow control valve units to prevent theft of ammonia from the nurse tank. Lock structure is provided for releasably holding the housing in its valve protecting position on the nurse tank storage vessel. The lock structure includes a coupling bar connected to at least one of the control valve housings, and an extension strap secured to the bar extends upwardly therefrom through a slot in the top wall of the housing. A bolt cutter proof lock is removably connected to the upper end of the extension strap above the top surface of the housing. Upon unlocking of the lock and removal from the extension strap, the housing may be lifted from the tank to provide access to the flow control valve units. The lock structure may be left in place as the housing is removed and replaced from the tank.

19 Claims, 2 Drawing Sheets

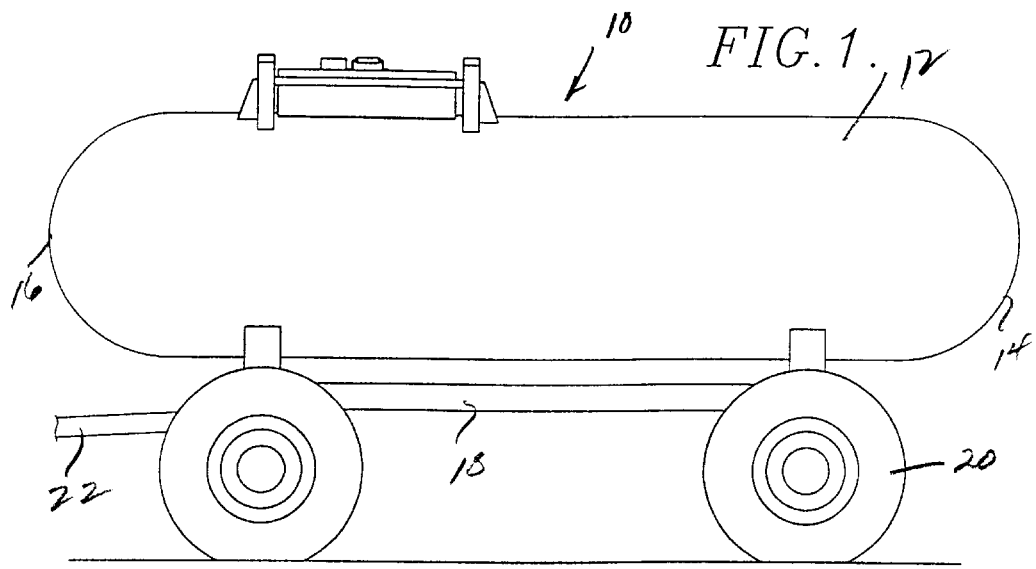
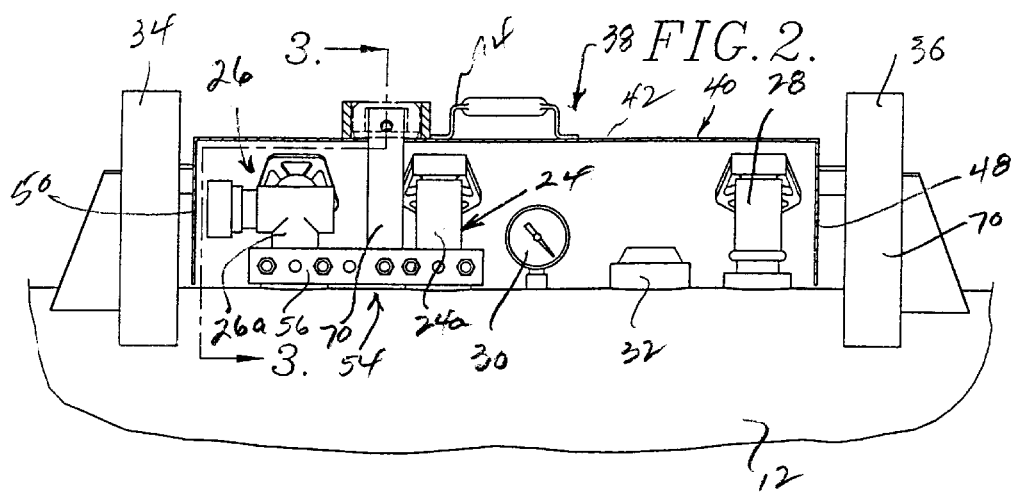
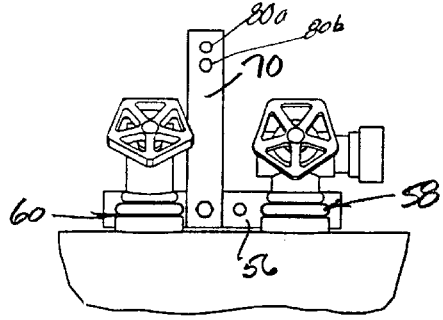
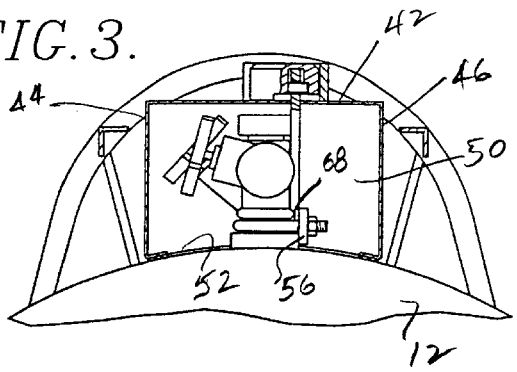

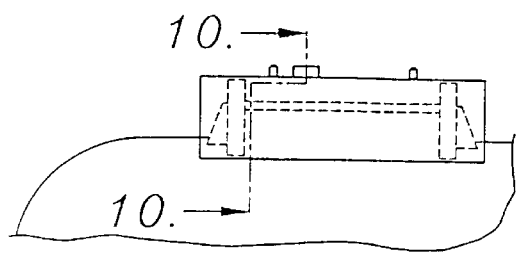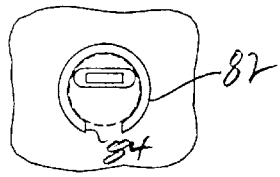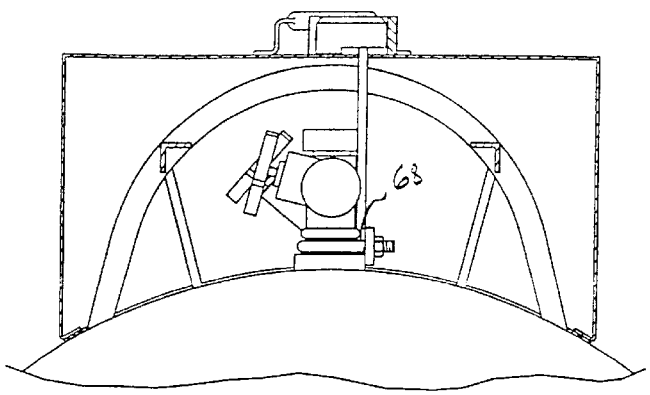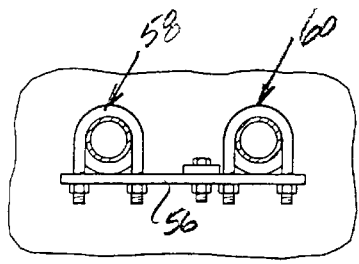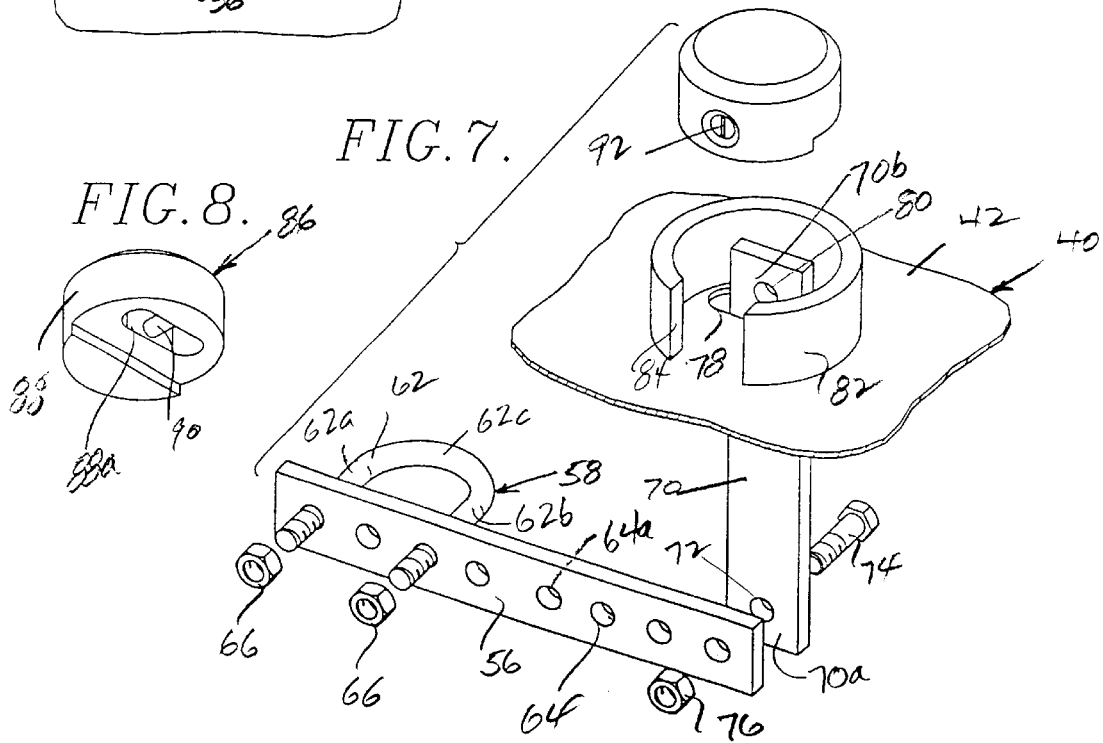

LOCK STRUCTURE FOR AMMONIA NURSE TANK VALVE UNITS

BACKGROUND OF THE INVENTION

1. Field of the Invention

This invention relates to an anti-pilfer lock device for protecting against unauthorized access to the flow control valve units projecting from the outer surface of a mobile ammonia nurse tank. In particular, the invention concerns an anti-pilfer housing configured to the to be removably placed over the flow control valve units of an ammonia nurse tank and that can be locked in place to prevent unauthorized removal of ammonia from the tank.

In particular, the box-shaped housing of the anti-pilfer lock device has a lower edge which is configured to complementally engage the outer cylindrical surface of an ammonia nurse tank, along with lock structure engageable with the flow control valve units of the tank and that is cooperable with a lock assembly for releasably locking the housing in the anti-pilfer disposition thereof on the tank. Upon unlocking of the lock structure, the protective housing may be removed from the nurse tank while the lock structure engageable with the flow control valve units remains in place. In this manner, the lock assembly may simply be unlocked and the protective housing removed from the tank for the user to gain access to the flow control valves. When it is desired to return the housing to the tank in blocking relationship to the flow control valves, that may be accomplished by simply returning the housing to its protective position on the tank followed by locking of the lock assembly.

2. Description of the Prior Art

Anhydrous ammonia has long been used as a fertilizer for crops. The ammonia is introduced into the soil by each of a series of nozzle assemblies operably associated with a tool pulled by the tractor that penetrates the soil. In order to minimize the ammonia application time in the field, many farmers purchase anhydrous ammonia from a central supplier who stores the liquid product in a relatively large, horizontally exposed bullet tank typically capable of storing anywhere from 20,000 to 100,000 gallons of liquid product. The supplier of the liquified ammonia often maintains a fleet of mobile cylindrical storage vessels known as nurse tanks that are on wheels and that may be towed as a trailer behind a vehicle. These mobile nurse tanks, each of which may be from three to four feet in diameter and 10 to 14 feet in length, are individually filled with liquified anhydrous ammonia upon order by a farmer, and then towed over the road to a point of application.

Typical mobile nurse tanks have external inlet and outlet flow control inlet valves, a flow control valve for return of vapor or liquid to the tank, and at least one gauge and at least two gauges which show the pressure that exists within the vessel, as well as the quantity of liquid remaining in the tank. These valves and gauges project outwardly from the outer cylindrical surface of the nurse tank. Some of the nurse tanks have roll bar structure associated with and located on opposite sides of the flow control valves and gauges to prevent damage to the valves and gauges in the event of inadvertent overturning of the tank.

Not infrequently, a farmer does not apply the entire quantity of anhydrous ammonia contained in a nurse tank during each day of fertilizer application. In certain instances, the farmer may not apply liquid anhydrous ammonia stored in the nurse tank until several days have elapsed from the time the mobile tank is first driven to a field storage location. As a consequence, ammonia may be surreptitiously removed from a nurse tank containing anhydrous ammonia while the tank sits unprotected in a usually remote field location. Such theft of ammonia is most often carried out under the cover of darkness. A hose may be attached to the outlet flow control valve of the tank and the control knob simply rotated to permit the pressurized ammonia tank to flow outwardly into a relatively small storage container.

The problem of theft of anhydrous ammonia stored as a liquid in mobile nurse tanks left at a relatively remote location in a farmer's field has been exacerbated in recent years because of the growing use of ammonia as a component in the illicit manufacture of methamphetamine. Processes for making methamphetamine are widely publicized, including internet sites, and sophisticated equipment is not required to produce the drug in limited space. As a consequence, farmers are more and more finding that ammonia is being stolen from nurse tanks that are left out in the field overnight or for days.

It is not practical to maintain constant surveillance over a nurse tank left out in a field, and inconvenient to pull a nurse tank into a location near the farmer's house each evening during use, or after partially being emptied and then not used again for several days. Even if the farmer did return the tank to a storage area near his house, persons bent on stealing ammonia from the tank could in some circumstances do so after dark.

SUMMARY OF THE INVENTION

The anti-pilfer lock device of this invention is a simple, effective and efficient way of preventing unauthorized removal of anhydrous ammonia from a mobile nurse tank. The device includes a housing configured to be removably mounted on the nurse tank in a position shielding the flow control valve units which project from the external surface of the tank from unauthorized access. Lock structure is provided which includes a lock assembly that is accessible externally of the housing, and components releasably joined to the lock assembly and engageable with at least one of the control valve units. The lock structure is cooperable with the housing for maintaining the housing in its flow control valve shielding position until the lock assembly is unlocked and housing is removed from the nurse tank.

The lock structure components include a coupling element that is positioned adjacent the flow control valve units when the housing is mounted on the nurse tank in the control valve unit shielding position, a connector assembly for connecting the coupling element to at least one flow control valve unit, and an extension releasably joining the coupling element and lock assembly when the housing is mounted on the nurse tank in said control valve unit shielding position. The coupling element preferably comprises an elongated bar adapted to be positioned alongside the valve control units, and a U-bolt assembly connecting the bar to a respective flow control valve body. The extension preferably comprises an upright strap member connected to the bar and extending through an opening therefor in the upper wall of the housing when the housing is supported on the shell of the nurse tank in enveloping relationship to the control valve units.

The upper end of the extension bar or strap which projects beyond the upper surface of the housing has an opening therein which removably receives the bolt of a lock that rests on the upper surface of the protective housing.

The coupling bar and U-bolts joining the coupling bar to the body portion of each of the flow control valve units, as well as the extension strap member connected to the coupling bar remain in place when the lock is unlocked and the protective housing removed from the nurse tank. Full access may thus be had to the control valve units for filling of the tank or removal of anhydrous ammonia therefrom. Reversal of such sequence results in return of the housing to its position in protecting relationship of the flow control valve and gauges projecting outwardly from the shell of the nurse tank.

Advantages of the anti-pilfer device of this invention include a simplicity of the design and parts, and the ease of installation and use. The anti-pilfer device may be used on tanks of various diameters with the only requirement to be to configure the lower edge of the housing to complementally engage a particular tank circumference. The anti-pilfer device does not impede on the integrity of the tank or in any way limit transport thereof behind a pulling vehicle. If desired, the housing may be constructed of a size to cover just the flow valve control units and the gauges projecting from the surface of the tank, or fabricated of a larger size to also enclose and envelope any roll bars on the outer surface of the tank and which are associated with the valve control units.

In addition, no modification of a nurse tank itself is required, and therefore no tank manufacturer/engineering review is required to install the anti-pilfer device on an existing nurse tank. Finally, the anti-pilfer device is relatively inexpensive to fabricate and requires little if any maintenance.

The improved design characteristics of the anti-pilfer device for ammonia nurse tanks, and favorable cost factors makes use thereof attractive to nurse tank fleet operators as a standard item on all of their nurse tanks.

BRIEF DESCRIPTION OF THE DRAWINGS

FIG. 1 is a side elevational view of a typical anhydrous ammonia mobile nurse tank of the type that has protective roll bars, and illustrating the improved anti-pilfer lock device of this invention mounted in position on the tank to prevent unauthorized access to the tank flow control valve units;

FIG. 2 is an enlarged fragmentary side elevational view of the tank as shown in FIG. 1, with the housing forming a part of the anti-pilfer lock device being shown in cross section for clarity;

FIG. 3 is a fragmentary enlarged vertical cross sectional view taken substantially along the irregular line 3—3 of FIG. 2 and looking in the direction of the arrows;

FIG. 4 is an enlarged fragmentary side elevational view of the flow control valve units of a typical nurse tank and looking at the valve units from the opposite direction as shown in FIG. 2;

FIG. 5 is a fragmentary horizontal cross sectional view through the flow control valves as shown in FIG. 2 to better illustrate components of the lock structure forming a part of the invention;

FIG. 6 is an enlarged fragmentary plan view of a part of the housing and associated lock structure with the lock assembly thereof being depicted in dashed lines;

FIG. 7 is a fragmentary enlarged exploded view of the anti-pilfer lock device;

FIG. 8 is a bottom perspective view of the lock assembly forming a part of the anti-pilfer device;

FIG. 9 is a fragmentary side elevational view of a alternate embodiment of the invention and illustrating a protective housing of dimensions to envelop and cover the flow control valve units and gauges as shown in FIG. 2, but also the roll bar structure of FIG. 2; and FIG. 10 is a fragmentary enlarged vertical cross sectional view taken substantially along the irregular line 10—10 of FIG. 9 and looking in the direction of the arrows.

DESCRIPTION OF THE PREFERRED EMBODIMENT

A typical anhydrous ammonia mobile nurse tank is shown in FIG. 1 of the drawings and identified broadly by the numeral 10. The tank 10 as illustrated is made up of an elongated, horizontally disposed cylindrical vessel 12 having hemispherical end portions 14, 16 to provide required high pressure strength. The vessel 12 is mounted on an undercarriage 18 having four wheels 20 and a tow bar 22. Referring to FIGS. 2–4, it is to be noted that nurse tank 10 in a typical configuration has an inlet flow control valve unit 24 projecting upwardly from the top of the tank, and an adjacent outflow control valve unit 26 aligned with valve 24. Another flow control valve unit 28 is also generally provided for pressure relief. In the instance of tank 10 as shown, a pressure gauge 30 is provided in proximal relationship to valve unit 24, while a liquid level indicator 32 is positioned between gauge 30 and valve unit 28. As is apparent from FIG. 2, valve units 24, 26 and 28 as well as pressure gauge 30 and indicator 32 project upwardly from the shell of vessel 12 and are in general alignment longitudinally of the vessel. Nurse tank 10, two semi-circular roll bars 34, 36 are preferably mounted on the shell of vessel 12 in protecting relationship to the control valve units and pressure gauge 30 and indicator 32, in the event of inadvertent roll over of the mobile tank 10.

In order to protect against unauthorized access to the valve units of nurse tank 10, an anti-pilfer device broadly designated 38 has a housing 40 removably mounted on vessel 12 in overlying, enveloping, and protecting relationship to the control valve units and gauges of tank 10 between roll bars 34, 36. Housing 40 is of sturdy metal and includes a generally rectangular top wall 42 integral with opposed rectangular side walls 44, 46 as well as opposed end walls 48, 50. It is to be observed from FIG. 3, for example that end walls 48, 50 are each provided with an arcuate lower edge 52 which complementally mates with the outer curvilinear surface of vessel 12. Thus, when housing 40 is mounted on the semi-cylindrical surface of tank 12, all four lower edges of housing 40 rest against the surface of the tank and effectively prevent unauthorized access to valves 24, 26, 28.

Device 28 further includes lock structure broadly designated 54 having a horizontal coupling element or bar 56 positioned adjacent the shell of vessel 12 in spanning relationship against the housings 24a, 26a of valve units 24, 26. Connector assemblies 58, 60 (best shown in FIGS. 3–7) are provided for connecting the bar 56 to the housings 24a, 26a. Each of the connector assemblies 58, 60 comprises a U-bolt assembly made up of a U-bolt 62 having opposed leg sections 62a, 62b which join by a bite section 62c. The U-bolt 62 is of a size to wrap around the lower housing portion of respective flow control valves 24, 26. It can be seen from FIG. 7, that the bar 56 has a series of openings 64 therein located strategically along the length of the bar. Leg sections 62a, 62b of each U-bolt 62 extend through corresponding openings 64 therefor in bar 56, while nuts 66 are threaded onto the outermost threaded ends of leg section 62a, 62b. It can be observed from FIGS. 2–5 and 7 that each of the U-bolts 62 and associated nuts 66 serve to rigidly affix bar 56 to housings 24a, 26a of corresponding flow control valve units 24, 26. If needed, shims 68 (FIGS. 3 and 10) can be provided between bar 56 and housings 24a, 26a in order to assure that the bar 56 is held in place in an upright position.

An extension 70 in the form of an elongated strap is also bolted to bar 56 in a position extending vertically therefrom. Although the extension strap 70 may be welded to bar 56 if desired, a preferred construction involves the provision of an aperture 72 in the lower end 70a of strap 70 which receives a bolt 74 that also extends through a selected opening 64 in bar 56 is held in place by nut 76. In the embodiment of the invention illustrated in FIGS. 1–6, strap 70 is connected to bar 56 by bolt 74 extending through opening 64a in the bar. Accordingly, strap 70 is located between flow control valves 24, 26.

The extension strap 70 is of a length such that it extends upwardly through a slot 78 therefor in the top wall 42 of housing 40. The uppermost extremity 70b of strap member 70 that projects through the top wall 42 of housing 40 when the latter rests on the outer surface of vessel 12 as depicted in FIGS. 1–3, is provided with an opening 80 located above the outer face of top wall 42. A segmented collar or sleeve 82 is secured to the outer face of top wall 42 in surrounding relationship to slot 78 and has a slot 84 in the side wall thereof.

A lock assembly 86 is provided to hold the housing 40 in the position thereof illustrated in FIGS. 1–3. The assembly 86 includes a lock body 88 having a passage 88a and which carries a slidable bolt 90 controlled by key operated mechanism. The operating key may be inserted into the opening 92 (FIG. 7) in the side wall of lock body 88. A preferred lock is a Pro-Series Master Lock 6270/970. Handle 94 carried by the top wall 42 of housing 40 facilitates placement and removal of housing 40 on tank 10.

The components of anti-pilfer device 38 are initially assembled by first connecting extension strap 70 to bar 56 in an appropriate position along the length of the bar 56 depending upon the relative orientation of valve units 24, 26, one with respect to the other using bolt 74 and its associated nut 76. This assumes that extension strap 70 has not previously been welded to bar 56 to present a monolithic structure.

Next, U-bolts 62 are placed around respective inlet and outlet flow control valves as shown for example in FIG. 5. The bar 56 is fitted against housings 24a, 26a of the valves 24, 26 with the leg segments of the U-bolts extending through corresponding openings 64 in bar 56. As noted, shims 68 may be provided between bar 56 and flow control valve housings 24a, 26a if necessary to maintain bar 56 in a transversely upright position. Nuts 66 are then threaded over the outer threaded ends of leg segments 62a, 62b of U-bolt 62 to affix bar 56 to the valve housings.

Housing 40 is lowered into position in overlying relationship to the valve units, the pressure gauge and volume indicator, with the upper extremity 70b of extension strap 70 projecting through slot 78 within the confines of sleeve 82. The slot 84 in collar 82 is located such that when lock assembly 86 is placed over the part of an upper extremity 60 70b of extension strap 70 which extends above the upper surface of top wall 52 and the extremity 70b of strap 70 is received in passage 88a in the lower part of lock body 88, the key receiving opening 92 of lock assembly 86 is directly aligned with slot 84. Upon insertion of a key in opening 92 followed by rotation of the key to shift bolt 90 outwardly and through the opening 80 in extension strap 70. Upon locking of the lock assembly 86, unauthorized access to the control valve units within housing 40 is precluded and the control valves are protected.

The anti-pilfer device 38 described above and illustrated in the drawings precludes theft of ammonia from a nurse tank, even though that tank may be left in the field without constant surveillance and supervision. The use of a Pro-Series Master lock in association with the confining segmented sleeve 82 is preferred because the lock fits snugly over the T-bar valve connector made up of bar 56, U-bolt assemblies 58, 60, and extension strap 70. The segmented sleeve 82 and the cylindrical configuration of lock body 88, in conjunction with the close fit of the lock assembly 86 against the upper face of top wall 40, makes the lock virtually bolt-cutter proof.

Extension strap 70 is illustrated in FIG. 4 as having two openings 80a, 80b in the upper extremity 70b thereof. The provision of two openings permits strap 70 to be used as an extension for bar 56 in the case of either a protective housing such as housing 40 adapted to fit within opposed roll bars at opposite ends of the control valve string, as well as for a larger box that will fit over and enclose the roll bar structure.

An alternative larger housing that fits over and encloses the roll bars is illustrated in FIGS. 9 and 10. Box 140 is identical to box 40 previously described except for the exterior dimensions thereof permit the box to be placed over both of the roll bars 34, 36 as well as the control valve units and gauges and indicators therebetween. The lock structure for holding the housing 40 in place may be identical to the lock structure previously described.

The provision of a multiplicity of openings 64 in bar 56 permits the T-bar structure made up of bar 56 and extension strap 70 to be used on a large variety of nurse tanks wherein the space between the inlet and outlet control valve units varies from tank to tank. Furthermore, although it is preferred that the bar 56 be connected to both of the control valve units 24, 26, in certain instances, only one U-bolt assembly 62 need be used, especially if a connection is made of the bar 56 to the control valve housing in closest relationship to the position of extension strap 70.

What is claimed is:

1. An anti-pilfer lock device for protecting against unauthorized access the flow control valve units projecting from the outer surface of an ammonia nurse tank and comprising:

a housing configured to be removably mounted on the nurse tank in a position shielding the flow control valve units from unauthorized access; and lock structure including a lock assembly which is accessible externally of the housing, and components releasably joined to the lock assembly and engageable with at least one of the control valve units and cooperable with the housing for maintaining the housing in said flow control valve unit shielding position until the lock assembly is unlocked and the housing is removed from the nurse tank, said components including a coupling element that is positioned adjacent to the flow control valve units, a connector assembly for connecting the coupling element to at least one flow control valve unit, and an extension releasably joining the coupling element and the lock assembly when the housing is mounted on the nurse tank in said control valve unit shielding position.

2. The nurse tank anti-pilfer lock device of claim 1, wherein said housing and the lock structure are constructed and configured for retrofitting on an existing ammonia nurse tank.

3. The nurse tank anti-pilfer lock device of claim 1, wherein the connector assembly includes a coupler connected to the coupling element and configured to span an associated flow control valve unit.

4. The nurse tank anti-pilfer lock device of claim 3, wherein said coupler comprises a U-bolt assembly having a pair of leg sections and an intermediate bight section joining the leg sections, the ends of the leg sections remote from said bight section being received in and connected to the coupling element.

5. The nurse tank anti-pilfer lock device of claim 3, wherein said extension is an elongated member having opposed ends, said housing being provided with an opening therein which clears one end of said elongated member, the other end of the elongated member being connected to said coupling element, and the lock assembly is releasably coupled to said one end of the elongated member.

6. The nurse tank anti-pilfer lock device of claim 3, wherein said elongated member has a lock bolt receiving opening in said one end thereof which extends out of the housing, and the lock assembly comprises a lock body having an opening therein for removably receiving said one end of the elongated member and a shiftable bolt which is receivable in the lock bolt opening in said one end of the member.

7. The nurse tank anti-pilfer lock device of claim 6, wherein said lock body has a surface which complementally engages with the upper surface of the extension and the housing, an operating mechanism for the shiftable bolt, and an operating mechanism aperture in the lock body rendering the operating mechanism accessible externally of the lock body along a side portion thereof.

8. The nurse tank anti-pilfer lock device of claim 7, wherein said housing is provided with an integral protective sleeve projecting outwardly therefrom away from the nurse tank which substantially complementally receives the lock body.

9. The nurse tank anti-pilfer lock device of claim 8, wherein said sleeve is provided with a notch therein aligned with said operating mechanism aperture in the lock body.

10. The nurse tank anti-pilfer lock device of claim 1, wherein said coupling element is an elongated bar and the member of the extension is connected to the bar at any one of a number of pre-selectable positions along the length of the bar.

11. The nurse tank anti-pilfer lock device of claim 10, wherein said bar is provided with a series of openings therein, said other end of the elongated member being provided with an opening alignable with any one of the openings in the bar, and a connector bolt extending through aligned openings in the bar and the elongated member.

12. The nurse tank anti-pilfer lock device of claim 1, wherein said housing includes a top wall and sidewalls, the outer margins of the side walls remote from the top wall being configured to complementally engage said outer surface of the nurse tank.

13. The nurse tank anti-pilfer lock device of claim 12, wherein said lock assembly is positioned for access externally of the top wall of the housing.

14. The nurse tank anti-pilfer lock device of claim 13, wherein said top wall of the housing is provided with a sleeve thereon projecting outwardly from the top wall and configured to generally complementally receive the lock assembly therein in protecting relationship thereto.

15. The nurse tank anti-pilfer lock device of claim 1 for use on an ammonia nurse tank having at least two flow control valve units in generally proximal relationship, wherein a connector assembly is provided for connecting the coupling element to each of the flow control valve units.

16. The nurse tank anti-pilfer lock device of claim 1, wherein said coupling element and said extension define an essentially T-shaped assembly.

17. The nurse tank anti-pilfer lock device of claim 1, wherein said coupling element and said extension define an essentially L-shaped assembly.

18. The nurse tank anti-pilfer lock device of claim 1 for use on an ammonia nurse tank having spaced roll bars on the outer surface thereof with the flow control valve units being located between the roll bars, and wherein said housing is configured to be removably mounted on the nurse tank in a position overlying the roll bars.

19. The nurse tank anti-pilfer lock device of claim 1 for use on an ammonia nurse tank having a plurality of flow control valve units and at least one gauge projecting outwardly from the surface of the tank, and wherein said housing is configured to be removably mounted on the nurse tank in a position shielding all of the control valve units and the gauge.

* * * * *